United States Patent
Badger, II

(10) Patent No.: US 10,137,898 B2
(45) Date of Patent: Nov. 27, 2018

(54) VEHICLE OPERATOR NOTIFICATION SYSTEM

(71) Applicant: FORD GLOBAL TECHNOLOGIES, LLC, Dearborn, MI (US)

(72) Inventor: Charles Everett Badger, II, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 15/342,435

(22) Filed: Nov. 3, 2016

(65) Prior Publication Data

US 2018/0118210 A1    May 3, 2018

(51) Int. Cl.
*B60W 30/182* (2012.01)
*B60R 16/023* (2006.01)

(52) U.S. Cl.
CPC ....... *B60W 30/182* (2013.01); *B60R 16/0236* (2013.01); *B60W 2510/10* (2013.01)

(58) Field of Classification Search
CPC ............ B60W 30/182; B60W 2510/10; B60R 16/0236
See application file for complete search history.

(56) References Cited

U.S. PATENT DOCUMENTS

| | | | |
|---|---|---|---|
| 5,841,201 A | 11/1998 | Tabata et al. | |
| 7,351,182 B2 | 4/2008 | Kobayashi | |
| 8,688,299 B2 | 4/2014 | Saito et al. | |
| 9,142,064 B2 | 9/2015 | Muetzel et al. | |
| 9,365,188 B1* | 6/2016 | Penilla | B60R 25/2018 |
| 2007/0276549 A1* | 11/2007 | Hijikata | B60W 30/182 701/36 |
| 2011/0125357 A1* | 5/2011 | Harumoto | B60K 6/48 701/22 |
| 2014/0066049 A1* | 3/2014 | Cho | B60W 50/085 455/420 |
| 2014/0081561 A1* | 3/2014 | Be | B60W 50/085 701/112 |
| 2014/0350775 A1* | 11/2014 | Yagi | G07C 5/008 701/31.4 |
| 2014/0358359 A1* | 12/2014 | Yagi | F02N 11/0814 701/31.4 |
| 2014/0379200 A1* | 12/2014 | Yagi | G07C 5/0808 701/29.4 |
| 2017/0270490 A1* | 9/2017 | Penilla | G06Q 10/20 |
| 2018/0024725 A1* | 1/2018 | Penilla | B60W 40/08 |
| 2018/0059913 A1* | 3/2018 | Penilla | G07C 5/008 |
| 2018/0089912 A1* | 3/2018 | Penilla | G07C 5/0808 |

FOREIGN PATENT DOCUMENTS

IN      02590MU2014 A    3/2016

* cited by examiner

*Primary Examiner* — David J Hlavka
(74) *Attorney, Agent, or Firm* — David Kelley; Brooks Kushman P.C.

(57) ABSTRACT

A vehicle includes an ignition, selector, and controller. The ignition is configured to start and shutdown the vehicle. The selector is configured to transition the vehicle between a standard driving mode and an economy driving mode. The controller is programmed to, in response starting the vehicle after a prior shutdown with the economy mode selected, generate a notification that the vehicle was operating in the economy mode upon the prior shutdown.

18 Claims, 2 Drawing Sheets

VEHICLE OPERATOR NOTIFICATION SYSTEM

TECHNICAL FIELD

The present disclosure relates to vehicles and control interfaces between vehicle systems and vehicle operators.

BACKGROUND

Vehicles include control interfaces that may communicate information and/or allow vehicle operators to control various subsystems.

SUMMARY

A vehicle includes an ignition, selector, and controller. The ignition is configured to start and shutdown the vehicle. The selector is configured to transition the vehicle between a standard driving mode and an economy driving mode. The controller is programmed to, in response starting the vehicle after a prior shutdown with the economy mode selected, generate a notification that the vehicle was operating in the economy mode upon the prior shutdown.

A vehicle controller includes input channels, an output channel, and control logic. The input channels are configured to receive signals indicative of ignition starts, ignition shutdowns, and selections of an optional driving mode. The output channel is configured to provide a command to generate a notification that the vehicle was operating in the optional mode. The control logic is configured to issue the command in response to an ignition start following a prior ignition shutdown with the optional mode selected.

A method of operating a vehicle includes shutting down a vehicle while an optional driving mode is selected, starting the vehicle following a period after the shutting down of the vehicle, and notifying the operator of the previous selection of the optional mode after the starting.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
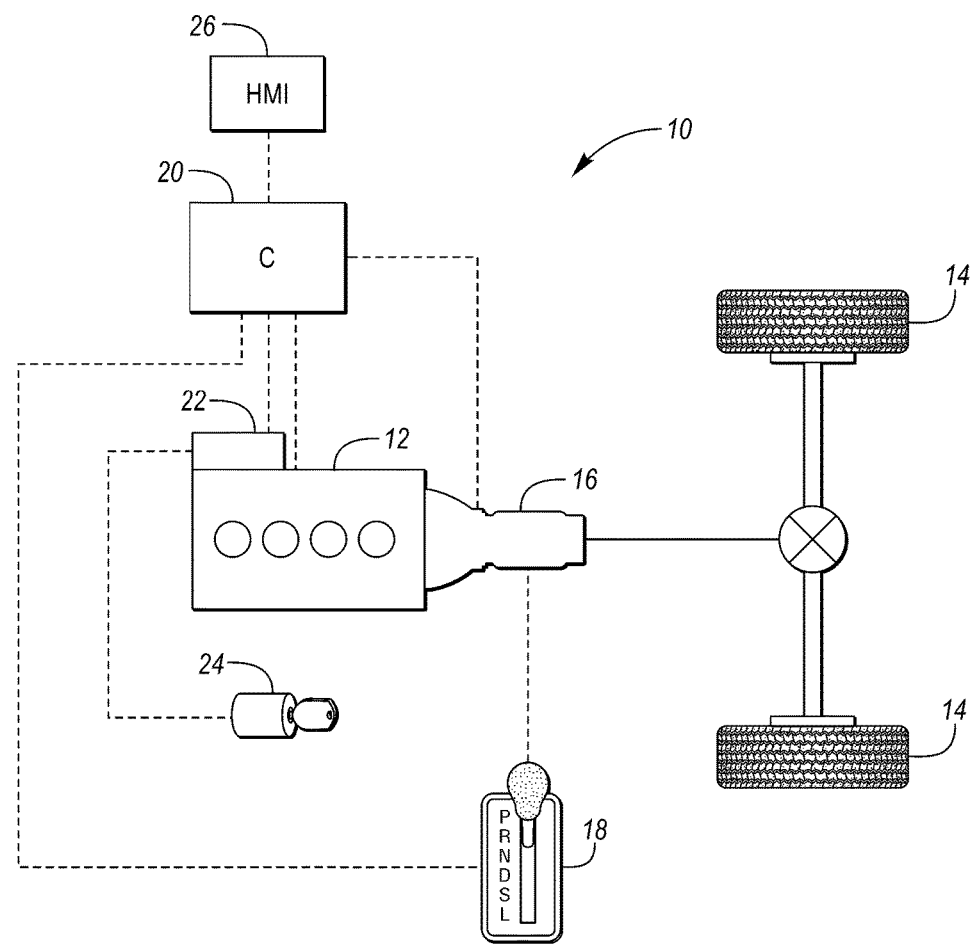
FIG. 1 is a schematic diagram representative of a vehicle and a vehicle powertrain.

Referring to FIG. 1, a diagram representative of a vehicle 10 and a vehicle powertrain is illustrated. The vehicle 10 includes an engine 12 that is configured to transmit power through the powertrain and to at least one drive wheel 14. The powertrain may also include a transmission 16. The transmission 16 may be an automatic transmission that includes gear sets (not shown) that are selectively placed in different gear ratios by selective engagement of friction elements, such as clutches and brakes (not shown), to establish the desired multiple discrete or step drive ratios. The friction elements are controllable through a shift schedule that connects and disconnects certain elements of the gear sets to control the ratio between a transmission output shaft and a transmission input shaft.

The transmission 16 may also include a gear selector 18 that allows an operator to shift the transmission 16 between park (P), reverse (R), neutral (N), drive (D), sport (S), and low gear (L) positions. The gear selector 18 may be mechanically linked to the transmission 16 or may be a shift-by-wire gear selector that sends a signal to the transmission 16 (or a controller thereof) to shift transmission 16 between the park (P), reverse (R), neutral (N), drive (D), sport (S), and low gear (L) positions. The signal sent from the gear selector 18 may be an electrical signal that is transmitted to the transmission 16 via an electrical wire or may be a wireless signal that is transmitted to the transmission 16 via a wireless transmitter. Wireless communications may be made via any known wireless technology known in the art. The gear selector 18 may be a lever, dial, one or more push buttons, touch screen, or any other user interface known in the art that may be utilized as a gear selector. The gear selector 18 may be a combination of any of the user interfaces know in the art.

The powertrain further includes an associated controller 20 such as a powertrain control unit (PCU). While illustrated as one controller, the controller 20 may be part of a larger control system and may be controlled by various other controllers throughout the vehicle 10, such as a vehicle system controller (VSC). It should therefore be understood that the controller 20 and one or more other controllers can collectively be referred to as a "controller" that controls various actuators in response to signals from various sensors to control functions such as starting/stopping the engine 12, selecting or scheduling shifts of the transmission 16, transitioning the transmission 16 to the desired gear based on an input from the gear selector 18, etc. The controller 20 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 10 or components thereof.

Control logic or functions performed by the controller 20 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 20. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle 10 may include a starter motor 22. The starter motor 22 may be configured to turn the crankshaft of the engine 12 in order to start the engine 12 when the vehicle operator engages an ignition switch 24. This may be referred to as a vehicle or ignition start. Various vehicle subsystems may also turn on or power up when the ignition switch 24 is engaged. The engine 12 and the various vehicle subsystems may in turn be shut down or powered down when the vehicle operator disengages the ignition switch 24. This may be referred to as a vehicle or ignition shut down.

The vehicle may include a human machine interface (HMI) 26. The HMI 26 may be representative of one or more HMIs. It should therefore be understood that the HMI 26 and one or more other HMIs can collectively be referred to as an "HMI" that issues communication outputs to the vehicle operator and/or controls various subsystems of the vehicle 10 in response to various inputs received from the vehicle operator. For example, the HMI 26 may be configured to notify a vehicle operator of previously selected driving modes while also being configured to receive inputs from the vehicle operator to select desired driving modes. The HMI 26 may include touchscreens, buttons, dials, knobs, selectors, audio input/output devices, haptic devices (i.e., vibrating motors), or any other device known by a person of ordinary skill in the art that is capable of issuing communication outputs (e.g., visual, audible, or haptic) to a vehicle operator and/or receiving inputs from a vehicle operator to control various subsystems of the vehicle 10.

The controller 20 may be configured to receive various states or conditions of the various vehicle components illustrated in FIG. 1 via electrical signals. The electrical signals may be delivered to the controller 20 from the various components via input channels. Additionally, the electrical signals received from the various components may be indicative of a request or a command (e.g., an operator request or input) to change or alter a state of one or more of the respective components of the vehicle 10. The controller 20 includes output channels that are configured to deliver requests or commands (via electrical signals) to the various vehicle components. The controller 20 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limiting. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
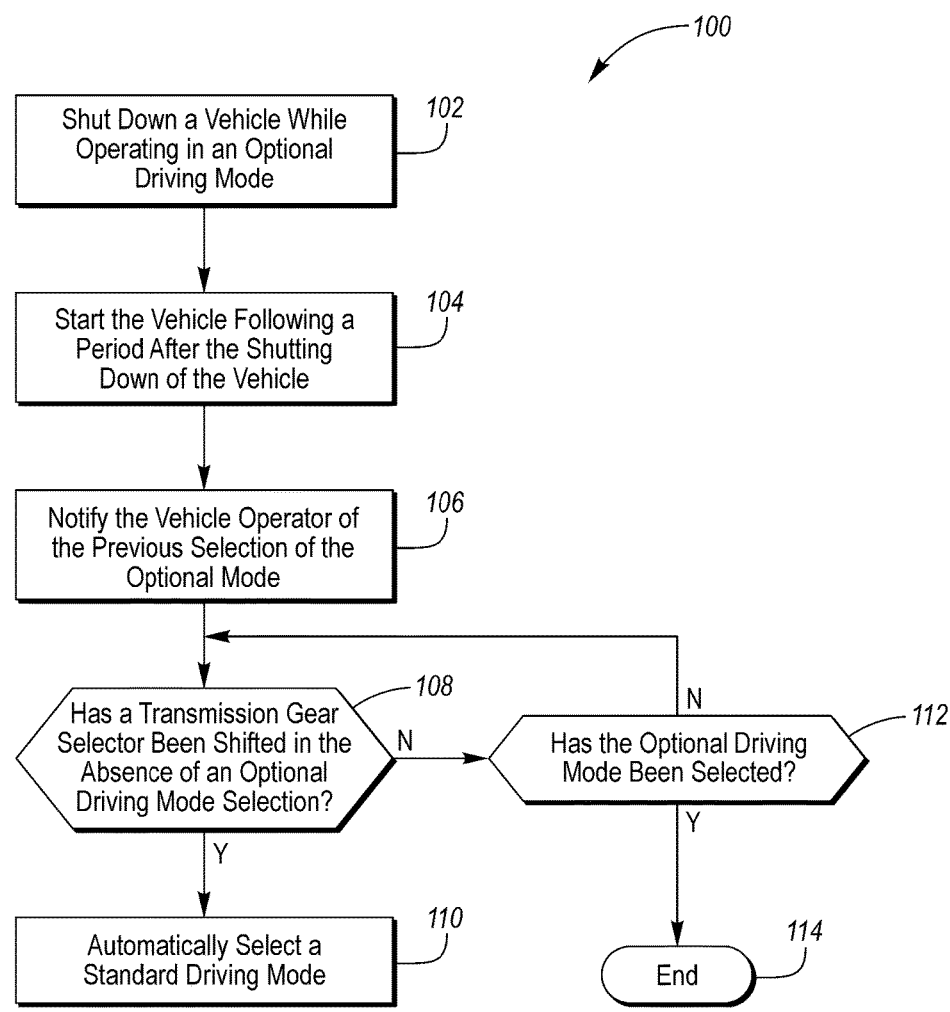
FIG. 2 is a flowchart illustrating a method of notifying a vehicle operator of a previous driving mode selection.

Referring to FIG. 2, a method 100 notifying a vehicle operator of a previous driving mode selection is illustrated. The method 100 may be implemented by algorithms and/or control logic stored within the memory of the controller 20 based on inputs received by the controller 20. The method 100 begins at block 102 upon shutting down the vehicle 10 (via the ignition 24) while the vehicle 10 is operating in an optional driving mode. The operator of the vehicle 10 may have selected the optional driving mode via a selector which may require the operator to engage a control interface such as the HMI 26. Optional driving modes may include, but are not limited to, economy driving modes and traction control disabled driving modes. The method 100 then moves out to block 104, where the vehicle 10 is started (i.e., the ignition 24 is engaged) following a time period after the shutting down of the vehicle that occurred at block 102. Upon starting vehicle 10 at block 104, the method 100 moves on to block 106 where the vehicle operator is notified that the vehicle 10 was operating in the optional mode upon the prior shutdown that occurred at block 102. The notification may be visual, audible, or haptic. Notification may include, but is not limited to, illuminating one or more lights, displaying text on a touchscreen, an audible notification, or activating vibration motors in a steering wheel, seat, or some other contact interface between the vehicle 10 and the vehicle operator (e.g., the gear selector 18).

Once the vehicle operator has been notified of the prior selection of the optional mode at block 106, the method 100 moves onto decision block 108 where it is determined if the transmission gear selector 18 has been shifted in the absence of an optional driving mode selection after starting the vehicle 10 at block 104. Shifting the transmission gear selector 18 at block 108 may refer to, but is not limited to, shifting the transmission 16 out of the parked (P) position, out of the neutral (N) position, into the drive (D) position, into the reverse (R) position, into the sport (S) position, or into the low gear (L) position. If it is determined at block 108 that the transmission gear selector 18 has been shifted in the absence of the optional driving mode selection after starting vehicle 10, the method 100 moves on to block 110 where a standard driving mode is automatically selected. Also at block 110, the notification issued at block 106 indicating that the vehicle 10 was operating in the optional mode may be terminated. If it is determined at block 108 that the transmission gear selector 18 has not been shifted in the absence of the optional driving mode selection after starting the vehicle 10, the method 100 moves onto decision block 112 where it is determined if the optional driving mode has been selected. If the optional driving mode has not been selected at block 112, method 100 returns to block 108. If the optional driving mode has been selected at block 112, the method ends at block 114. Also at block 114, the notification issued at block 106 indicating that the vehicle was operating in the optional mode may be terminated. It should be understood that the flowchart in FIG. 2 is for illustrative purposes only and that the method 100 should not be construed as limited to the flowchart in FIG. 2. Some of the steps of the method 100 may be rearranged while others may be omitted entirely.

An option driving mode may include an economy driving mode. Economy driving modes may adjust the control parameters of various vehicle subsystems in order to increase fuel economy. In order to increase fuel economy, economy driving modes may adjust the shift points of the transmission 16 (e.g., shift the transmission 16 into a higher gear at a lower vehicle speed than would occur in a standard driving mode), reduce the power to a heating, ventilation, and air conditioning (HVAC) system, slow an accelerator pedal response, provide feedback on the accelerator pedal, enhance regenerative braking in hybrid vehicles, or perform any other action that may increase the fuel economy of the vehicle 10.

Another optional driving mode may be a driving mode where a traction control system of the vehicle 10 has been disabled. Traction control systems are control systems that maintain a desired traction between the drive wheels 14 of the vehicle 10 and the road that the vehicle is traveling on. Traction control systems may be activated when the output torque of the vehicle powertrain is mismatched to road surface conditions, which may result in an undesirable slipping condition of the drive wheels 14. In order to maintain the desired traction between the drive wheels 14 and the road, the traction control system may apply the brakes to one or more of the vehicle's wheels, reduce spark to one or more of the engine cylinders, reduce the fuel being supplied to one or more of the engine cylinders, close the throttle, decrease the torque of an electric motor in hybrid vehicles, or perform any other action that may adjust the torque of the vehicle powertrain to match the road surface conditions.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an ignition configured to start and shutdown the vehicle;
    a selector configured to transition the vehicle between standard and economy driving modes;
    a transmission having a gear selector; and
    a controller programmed to,
        in response to starting the vehicle after a prior shutdown with the economy mode selected, generate a notification that the vehicle was operating in the economy mode upon the prior shutdown, and
        in response to the gear selector being shifted out of a parked position in the absence of an economy mode selection after starting the vehicle, automatically select the standard driving mode.

2. The vehicle of claim 1, wherein the controller is programmed to, upon the gear selector being shifted out of a neutral position in the absence of an economy mode selection after starting the vehicle, automatically select the standard driving mode.

3. The vehicle of claim 1, wherein the controller is programmed to, upon the gear selector being shifted into a drive position in the absence of an economy mode selection after starting the vehicle, automatically select the standard driving mode.

4. The vehicle of claim 1, wherein the controller is programmed to, upon the gear selector being shifted into a reverse position in the absence of an economy mode selection after starting the vehicle, automatically select the standard driving mode.

5. The vehicle of claim 1, wherein the controller is programmed to, in response to an operator input to remain in the economy mode after starting the vehicle but prior to a position of a transmission gear selector being shifted, resume the economy mode.

6. A vehicle controller comprising:
    input channels configured to receive signals indicative of ignition starts, ignition shutdowns, selections of an optional driving mode, and a transmission gear selector being shifted out of a neutral position;
    a first output channel configured to provide a command to generate a notification that the vehicle was operating in the optional mode;
    a second output channel configured to provide a command to activate a standard driving mode; and
    control logic configured to,
        issue the command to generate the notification in response to an ignition start following a prior ignition shutdown with the optional mode selected, and
        generate the command to select the standard driving mode in response to the transmission gear selector being shifted out of the neutral position in the absence of an optional mode selection after the ignition start.

7. The controller of claim 6, wherein the optional driving mode is an economy driving mode.

8. The controller of claim 6, wherein the optional driving mode is a traction control disabled driving mode.

9. The controller of claim 6 further comprising:
    an additional input channel configured to receive a signal indicative of a transmission gear selector being shifted out of a parked position, and wherein the control logic is configured to generate the command to activate the standard driving mode in response to the transmission gear selector being shifted out of the parked position in the absence of an optional mode selection after the ignition start.

10. The controller of claim 6 further comprising:
    an additional input channel configured to receive a signal indicative of a transmission gear selector being shifted into a drive position, and wherein the control logic is configured to generate the command to activate the standard driving mode in response to the transmission gear selector being shifted into the drive position in the absence of an optional mode selection after the ignition start.

11. The controller of claim 6 further comprising:
an additional input channel configured to receive a signal indicative of a transmission gear selector being shifted into a reverse position, and wherein the control logic is configured to generate the command to activate the standard driving mode in response to the transmission gear selector being shifted into the reverse position in the absence of an optional mode selection after the ignition start.

12. A method of operating vehicle comprising:
shutting down a vehicle while an optional driving mode is selected;
starting the vehicle following a period after the shutting down;
notifying the operator of the previous selection of the optional mode after the starting; and
resuming the optional mode after the starting responsive to an operator input to remain in the optional mode prior to a position of a transmission gear selector being shifted.

13. The method of claim 12, wherein the optional driving mode is an economy driving mode.

14. The method of claim 12, wherein the optional driving mode is a traction control disabled driving mode.

15. The method of claim 12 further comprising selecting a standard driving mode in response to a transmission gear selector being shifted out of a parked position in the absence of an operator input to remain in the optional mode after the starting.

16. The method of claim 12 further comprising selecting a standard driving mode in response to a transmission gear selector being shifted out of a neutral position in the absence of an operator input to remain in the optional mode after the starting.

17. The method of claim 12 further comprising selecting a standard driving mode in response to a transmission gear selector being shifted to a drive position in the absence of an operator input to remain in the optional mode after the starting.

18. The method of claim 12 further comprising selecting a standard driving mode in response to a transmission gear selector being shifted to a reverse position in the absence of an operator input to remain in the optional mode after the starting.

* * * * *